United States Patent Office 3,066,062
Patented Nov. 27, 1962

3,066,062
ART OF ADHESIVES, PRODUCTS OF PLYWOOD AND LAMINATES IN WHICH SAID ADHESIVE IS THE BONDING AGENT
Rollin M. Gordon, Elma, Wash., and George W. Burchard, Jr., 6503 57th NE., Seattle, Wash.
No Drawing. Filed Apr. 9, 1956, Ser. No. 577,430
4 Claims. (Cl. 154—45.9)

Our invention and discovery relates to the art of adhesives, the products of plywood and laminates in which the said adhesive forms the bonding agent, and the process of making said products.

More particularly, in general our invention relates to a cold press type of adhesive commonly employed in the making of plywood for interior or inside use.

The plywood of our invention and discovery is characterized by having water resisting properties and strength of bond of the veneer sheets substantially equal to or greater than resin plywood in which the heating process creates the bond of resin glue by thermosetting and forms the plywood product designed for outside or exterior use where it is subject to the weather. In short, the laminate of our invention and discovery is many times stronger than commonly used plywood for inside use.

In general, our invention relates to the converting of the commonly employed economical cold press glues to make greatly improved products having those properties of fiber-pulling strength and water resistance which commonly characterize the expensive resin glued plywood. Further, our invention and discovery relates to plywood or laminate products characterized by being mold resistant.

At the present time, cold press glues are subject to the development of mold on the face of the plywood which in time operates to cause the veneer sheets of the laminate to pull apart. An attempt has been made to correct this by the addition of certain chemical compositions sold on the market under trade names, but up to date such attempts have not been successful to a degree that meets the requirements and full satisfaction of the trade.

A primary object of our invention and discovery is to provide a cold press glue and plywood product characterized by its exceedingly high water resistant and mold resistant properties, and at the same time provide a product which may sell at a price far less than resin glues which are very expensive, employing outside heat to actuate the thermosetting reaction. The economy in manufacture and the lessened sales price of the plywood of our invention and discovery, while at the same time providing a product which has the characteristics of an exterior or outside plywood product especially prepared to resist weather, renders the present invention and discovery of great merit in meeting the requirements of the Federal Housing Administration for loans, insurance, and home construction, and, in fact, for government insured loans on home building generally because of the government standards relating to construction materials. The present cold press products are disappointing in their failure to resist water and to come up to requirements which are practically necessary for sound construction.

As set forth above, in preparing the adhesive for manufacturing the plywood of our invention, the regular adhesive formula commonly employed for such purposes may be intermixed and compounded in the usual manner, and as the last step thereof certain chemicals comprising the invention and discovery herein are added to the said prepared adhesive. The added chemicals react to the adhesive to effect a definite lowering of the normal viscosity of said adhesive and to create as one of the outstanding features of the reaction exceedingly high heat which in turn operates to vaporize or render gaseous certain of the chemicals added as the last step (said chemicals will be hereinafter referred to as the "additive" chemicals), thereby forcing them to penetrate the cellular structure of the wood. The result is a substantially adhesive-impregnated wood structure which is characterized by its great strength, water resistance, and mold resisting properties.

The assembled plywood with such adhesive applied to the core and inner faces of the veneer sheets forming the plywood is then inserted in a plate press without any outside heat being applied. Then the pressure is raised to the desired amount.

One step of the present process that has facilitated the pressure developed by the gas in forcing the adhesive throughout the cellular structure is the manner in which the veneer sheet is peeled from the peeling log. This step involves setting the knife or "doctor" at an angle, which may be 45 degrees, to the axis of the peeling log, thereby causing small fractures to extend in great numbers throughout the thickness of the veneer sheet. Thus the adhesive with its lowered viscosity is facilitated in penetrating through not only the cellular structure but throughout the minute fractures thus formed in the veneer sheet. The development of said gaseous pressure continues for some twenty minutes, and the gas has a strong odor.

Summarily, and therefore incompletely, our invention and discovery involves the addition of certain chemicals to standard adhesive formulae employed by plywood manufacturers in their regular manufacture, such chemicals being of a character which do not interfere but cooperate with the materials constituting the formulae for bonding plywood sheets after the manner of cold press glues.

And, finally, our invention and discovery involves the providing of such a superior product, substantially equal in strength of fiber-pulling properties and water resistant properties to resin glued plywood of hot press process designed particularly for outside or exterior use; and the product of our invention is exceedingly high in mold resisting properties, and at the same time exceedingly economical in comparison with hot press resin glues.

Also, in forming a paper laminate our invention and discovery has proven of great value. It appears that the adhesive is less soluble due to the plasticizing of the protein base of the adhesive by reason of the action of the additives.

Our invention is directed to (a) a laminated adhesive, (b) a laminated product, (c) a plywood product, (d) an organic laminated product, and (e) an adhesive composition for bonding an organic cellulosic structure. These terms are only in fact different names for a composition or product but they serve to more definitely point out the resulting object of manufacture.

The chemicals which we add as our additive to the adhesive composition of common practice are fumaric or maleic acid or, in short, unsaturated dibasic acid containing 4 carbon atoms. Also sodium benzoate is included because we find that it makes more effective the said acid element of our additive especially as to its antimold and fungus property. The sodium benzoate may be omitted from use with the acids so that said acids may be employed alone but not with the thorough results obtained when the benzoate is added. Carbon bisulfide and carbon tetrachloride are chemicals and a part of the adhesive of common practice and these when present cooperate with the chemicals of our addition to develop gas which is especially helpful in developing pressure when the product is in the press. Such pressure in turn contributes to the thoroughness of impregnation of the adhesive in the laminated product.

The components of the adhesive of common practice may be of conventional proportion. The preferred proportion as between fumaric and maleic acid on the one hand and the sodium benzoate on the other is 8 parts to 8 parts in not more than 32,000 parts of water, said benzoate contributing an effective portion of the preservative result against mold and fungus growth, the adhesive as a whole being characterized by its water resistant properties. The water resistant properties of said adhesive are substantially equal to a hot press resin laminate. Also said adhesive is characterized by its high penetrating quality.

The proportions of the adhesive including the additive of our invention may be as follows:

100 pounds of soy bean flour, that is the proteinaceous basis; an anti-foam agent, 1.5 pounds; line 10 to 15 pounds; sodium hydroxide (76%), 6 to 10 pounds; sodium silicate, 20 to 30 pounds; solvent, 1 to 2 pounds; fumaric acid or maleic acid or unsaturated dibasic acid having 4 carbons, ⅛ to 1 pound; sodium benzoate, ⅛ to 1 pound; and water, approximately 400 pounds (that is, enough to form a good plastic adhesive consistency). Such adhesive is characterized by its relatively low viscosity.

The resulting laminated product, plywood or organic product, is characterized by its resistance to mold and fungus growth, water resistant properties being substantially equal to those of a hot press resin plywood and said adhesive being characterized by its high degree of penetrability.

Such plywood product is also characterized by its development of a large amount of heat due to the continuing chemical reaction within the assembled laminae, which heat operates to expel three-fourths of the normal moisture content from the plywood rendering the product relatively dry.

As a test under actual installation conditions with plywood embodying the present invention and discovery is the following: In a 300-unit housing project, the contractor employed the plywood embodying our invention. Some 30 such houses employing the product of our invention, when but partially constructed so that they were open to the weather, without any roofs and uncovered as to their end portions, were subjected to severe stormy winter weather, that is, to rain followed by freezing, and then to thawing and drying out, and then re-soaking with rain and again freezing weather. There were several inches of water accumulated on the floors, which were constructed with the plywood of our invention and discovery. However, such was the bond created in the plywood by our invention that the product survived the stormy spell of wetting, freezing, thawing, and drying, without injury. Side by side with some of the product of our invention and discovery was the product of competing plywood manufacturers. These latter productes failed and pulled apart. When complaint was made by the contractor to the manufacturers of such failing plywood product, their agents, upon examination of the product of our invention, concluded that said product was manufactured by hot press resin process especially designed for outside or exterior use and sold for inside use. Such was the splendid character exhibited by our product that such parties, including their chemists, were completely misled into thinking it was a product manufactured for exterior use rather than one manufactured for interior use.

Our product has been subjected to the standard "cycle" test as follows: The plywood embodying our invention and discovery was subjected to a soaking for four hours in water, and was then dried in an oven for twenty hours. This constitutes one "cycle."

Another test to which our product has been subjected is a boiling test. A plywood product embodying our invention and discovery was subject to boiling hot water for seven hours, after which the bond held firmly when the product was dried out. One sample of this tested product was opened up after being submitted to the boiling water for seven hours, and it came apart relatively easily while wet. A piece similar in every respect, dried out after having been subjected to boiling water like the first piece, was found to be bound together with great firmness and fiber-pulling strength. When it is remembered that the glue line is of a thickness of but some one-thousandth of an inch, the adhesive force capable of such strength as to pull fibers (that is, capable of being stronger than the bond between the fibers of the piece of wood itself), the experiment takes on a most amazing character.

Hot press resin plywood for exterior or outside use where exposed to the weather is tested differently than cold press plywood for interior or inside use which is tested by the cycle test explained above. Resin bonded plywood is tested by boiling for four hours, then drying in an oven for twenty hours, then again boiling for four hours and drying for twenty hours in an oven. If then it holds together sufficiently to provide about 90% fiber-pulling force upon separation of the veneer sheets, it qualifies as an outside or exterior product of resin-processed glue. Cold press plywood which holds together for five cycles qualifies as an inside plywood product.

The plywood of our invention has stood the cycle test of more than thirty cycles, and one in particular has gone as high as forty-nine cycles as tested in the laboratory and still had not come apart, so the great advantage of our product over the commonly manufactured inside plywood is very marked. Furthermore, a plywood product embodying the invention and discovery herein was submitted to the boiling test and boiled for some fourteen hours and was then pried apart revealing a strong bond still remaining, which is a test not employed in manufacturing inside or interior plywood.

Another piece of plywood embodying our invention and discovery, similar in all respects to the above, was continued under the boiling water test for fourteen hours and then dried, and this manifested a strong bond with no evidence of de-lamination. The same upon being pried apart showed strong fiber-pulling strength.

Another characteristic of the adhesive of our invention and discovery appears to relate to the low viscosity of the glue solution. Rather than having a normal tacky character, as revealed by pulling a sample of the glue between the fingers to see how far it will stretch before breaking, the adhesive of our invention and discovery pulls apart very soon in contrast to a commonly accepted good glue of one-fourth to one-half inch stretch. This feature of low viscosity provides for the glue to be much more readily penetrable into the cellular structure of the veneer sheets forming the plywood, and therefore to condition the surface against mold growth. At any rate, the surface is resistant to mold growth. This low viscosity and penetrating property, it is deemed, is one contributing cause for the non-appearance of mold on the face of the plywood of our invention—that is, it is one reason aside from the anti-bacteria and anti-fungus character of the chemicals employed.

Another feature of our invention and discovery which is preferably employed to obtain optimum results relates to the character of cutting the veneer sheets forming the laminae of our plywood product. Instead of having the edge of the knife, the so-called "doctor," which cuts the veneer in peeling the same from a steamed log, disposed parallel to the axis of the peeler log, it has been found that if this knife edge is disposed at an angle between 20° and 45°, there results a fracturing of the veneer sheet; that is, the sheet is converted into an infinite number of minute fractures scarcely noticeable to the eye and yet sufficiently open to receive the penetrating glue under the pressures developed. In this wise, the glue is caused, it would appear, to reach the surface of the plywood when the assembled veneer sheets with the intervening glue are subjected to pressure. Since the glue is stronger than the wood fibers when the assembled sheets are glued and the adhesives are caused to set, the whole permeated product becomes a unit of great strength with the adhesive interspersed through the minute fractures and cellular structure so that the veneer sheet is "welded," as it were into a solid compact.

A feature characterizing our invention is the employment of a gas to develop pressure to cause the adhesive to penetrate the wood sheets, which gas is developed by the interaction of chemicals in the newly assembled plywood, and which gas develops a force so great that it causes the adhesive, the viscosity of which has been reduced by the addition of the chemicals of our invention and discovery, to penetrate throughout the cellular structure and minute fractures formed crosswise of the thickness of the veneer sheets. Thus, the result is an assembly of plywood which is thoroughly impregnated with the adhesive, thereby making it an exceedingly strong structure.

This feature of low viscosity provides for the glue to be much more readily penetrable through the minute fractures formed in the veneer sheets and therefore such penetration provides for conditioning the surface against mold growth, as presently appears. It is to be remembered that the lowering of the viscosity by reason of the addition of said additive at the end of the preparation of the glue mix is only for a period of some twenty to thirty minutes. Thereafter, the glue becomes thicker as time goes on. The low viscosity and penetrating property for the said early period, it is deemed, is one contributing cause for the non-appearance of mold on the face of the plywood of our invention—that is, it is one reason aside from the anti-bacteria and anti-fungus character of the chemicals employed in the additive.

In preparing the regular adhesive formula, a solution of carbon bisulfide and carbon tetrachloride is mixed into the adhesive mixture for one minute and then there is added pentachlorphenol as a fungicide (not, however, giving effective results; said pentachlorphenol is added to meet present requirements of the Douglas Fir Plywood Association). Thereafter the entire adhesive mixture is mixed for five minutes; then there is added as the last step in preparing the adhesive mixture, the said additive of our invention which comprises fumaric acid and sodium benzoate. The entire mixture is then mixed for ten to twenty minutes.

The adhesive is applied to the different layers and the various sheets of the plywood are disposed in assembled position with the glue on their inner surfaces, they are subjected to the commonly employed plate press. Thereupon, due to the heat formed by the chemical reaction of components of the adhesive, some portions are changed to their vapor phase, creating tremendous pressure.

Carbon bisulfide vaporizes at 46.5° C. It is caused to pass from liquid to vapor or gas at said temperature. This is the chemical with the lowest vaporization point in the mixture. The chemical present in the mixture with the next vaporization point is carbon tetrachloride; and the next is sodium benzoate.

It was noted that after the pressure on the gauge arrived at the chosen predetermined pressure, the hydraulic pump was discontinued. However, it was noted that the pressure continued to increase, and gradually the springs which are provided to act as a safety means for the press were being compressed. So the pressure had continued to increase after the pump had ceased and at this point was greatly in excess of the pressure normally applied. To prevent the breaking of the press, some ten minutes having elapsed the assembly was immediately released from the press. The plywood assemblies were stacked and allowed to stand in the warehouse. The product thus provided was found to have the complete impregnation of the adhesive throughout the assembly. The assembly of plywood thus made retained its heat for a much longer period than is normal.

Accordingly, in making the plywood, the additive is added the last part of the adhesive formula, and then the adhesive is applied to the sheets of veneer, the sheets are subjected to plate pressing, and they are set aside to age. After a period of some fifteen to thirty minutes the gas mostly expends itself and then the product is ready for stacking. The plywood sheets remain warm for a long period, as much as from two to three weeks.

It is important that the assembled plywood be held within compressed limits in the press so that the developed gases are caused to force the adhesive throughout the cellular and fractured wood structure of the mass of plywood. Pressure may be continued by stacking the sheets of plywood from the press. The gas which is developed in the adhesive after adding the additive causes small bubbles to be distributed throughout the adhesive mass, and then when pressure is applied such bubble condition of the glue is removed.

The viscosity of the glue being reduced by the chemicals permits the pressure to make it penetrate throughout the cellular structure so that we have in fact a truly impregnated product. Even knotty pieces of veneer assembled in plywood was holding together though damp.

The pump in making the plywood is operated until the pressure of thirty-five hundred pounds per square inch is attained, and there locked so that the plywood assembly is held and supported mechanically.

The pressure on the assembled lamina thus mechanically held then continues to increase as the gas develops, which is allowed to continue developing for a period of five to fifteen minutes. During the time the gas is being developed it raises the pressure to a point the magnitude of which is unknown as yet. After some fifteen to thirty minutes the gas is mostly spent and the plywood is exceedingly hot (too hot for the hand), and it continues hot, after being piled up some sixty sheets high, for about two to three weeks, due to the continuation of chemical reaction.

Let it be particularly noted that the degree of pressure developed by the gas may be controlled or regulated by varying the length of time that the adhesive after being mixed is allowed to stand so that part of the period for the development of gas is consumed while the glue is unspread, i.e., in the glue-making vessel.

The high heat developed is much higher than that in ordinary cold press plywood and operates to dry out the plywood so that instead of sixteen to thirty-four percent of moisture, the moisture in our plywood product ready for shipping is only about six and one-half (6.5%) percent, thus saving a great sum in freight charges on every carload of freight. Applicants state that heat developed is so great that even when snow fell on the plywood the snow melted.

Contractors familiar with the improved properties of the plywood product embodying the present invention and discovery pay a premium for such plywood, thereby testifying to the meritorious contribution by and improved properties of the product.

The detailed step by step process of making the adhesive of our invention and discovery for the plywood embodying our said adhesive comprises the following; that is, the adhesive formula for making the plywood and process of preparing the same may be one in part commonly used in plywood plants on the Pacific Coast, as next set forth:

(1) Water—heated to 60° F. ------------------------- lbs-- 175
(2) Add adhesive mixture comprising ground soya bean cake (oil having been removed) ------------------------- lbs-- 100
(3) Add commonly employed anti-foaming agent ------- lbs-- 1.5
(4) Above components are mixed about 7 minutes in regular glue mixer of the roll type.
(5) Water—heated to 60° F. ------------------------- lbs-- 200
  Mix about 2 minutes.
(6) Lime, 12 lbs.} Mix together separately and add.
  Water, 24 lbs.}
(7) Mix above 2 minutes.
(8) Caustic NaOH, 8 lbs.}
  Water, 8 lbs.} Mix together separately about 2 minutes.
  Sodium silicate, 25 lbs.}
(9) Add and mix all 2 minutes.
(10) Carbon bisulfide } Solution intermixed 1 minute.
  Carbon tetrachloride}
  Add and mix all 5 minutes.
(11) Sodium benzoate} ------------------------- lb-- 1
  Fumaric acid }
(12) Mix all 1 minute.
  (N.B. The additive is stirred in at the very last and then applied to the veneer sheets in assembling same into plywood product.)
(13) Place in plate press.
(14) Hold for 10–15 minutes.

The pressure normally applied in the assembly of cold press plywood is 1000 to 2800 pounds, but we permit this pressure to develop by pumping to a higher pressure and then we are very careful to be sure to release the product from the press and allow the gas to gradually dissipate while the plywood is stacked in piles of 40–50 or 60 sheets one above the other.

The pressure on the pump in making the plywood is operated until the predetermined pressure is reached and then locked so the plywood assembly is held and supported mechanically. The pressure on the assembled lamina thus mechanically held, then continues to increase as the gas develops which is allowed to continue developing for a period of five to fifteen minutes. During this time, gas is being developed and it raises the pressure to a point the magnitude of which is unknown as yet. After some fifteen to thirty minutes the gas is mostly spent and the plywood is exceedingly hot and continues hot after being piled up some 60 sheets high for about two to three weeks due to the continuation of the chemical reaction. The gas forming an elastic pressure operates peculiarly effectively in causing the glue to penetrate through the veneer sheets with their cellular structure and minute fractures until the entire mass is substantially impregnated with glue and welded together.

The high heat developed is much higher than in ordinary cold press plywood and operates to dry out the plywood so that instead of 16% to 34% of moisture, the moisture in our plpwood product ready for shipping is less than 10%, thus saving a great sum for freight charges on every carload of freight.

Our invention and discovery is particularly well adapted to forming laminae of paper, particularly in forming laminae where one lamina is paper and another is wood; also in causing asbestos sheets to adhere to wood.

Furthermore, our invention is particularly useful in forming pressed sheets formed of wood fibers and wood chips—in all of which the importance of the insolubility and strength of the adhesive is of the utmost importance. Another application of our invention is in the lamination of lumber where a strong member is formed by superimposing a second piece so that the grain of one piece is different from that of another.

From the above it is manifest that our adhesive is characterized by its insolubility in water on the glue line as well as its strength of bond and its penetrability through the structure of the lamina.

We claim:

1. A plywood product having as its binding element an adhesive mixture comprising substantially 100 pounds of soybean flour; an anti-foam agent, 1.5 pounds; lime, 10–15 pounds; sodium hydroxide (76%), 6–10 pounds; sodium silicate, 20–30 pounds; solvent, 1–2 pounds; fumaric acid, 1/8–1 pound; sodium benzoate, 1/8–1 pound; and water, approximately 400 pounds; said plywood product being characterized by its resistance to mold and fungus growth, and by its water resistant properties being substantially equal to those of a hot press resin plywood, and said adhesive being characterized by its high degree of penetrability.

2. A plywood product having as its binding element an adhesive mixture comprising substantially 100 pounds of soybean flour; an anti-foam agent, 1.5 pounds; lime, 10–15 pounds; sodium hydroxide (76%), 6–10 pounds; sodium silicate, 20–30 pounds; solvent, 1–2 pounds; maleic acid, 1/8–1 pound; sodium benzoate, 1/8–1 pound; and water, approximately 400 pounds; said plywood product being characterized by its resistance to mold and fungus growth, and by its water resistant properties being substantially equal to those of a hot press resin plywood, and said adhesive being characterized by its high degree of penetrability.

3. A plywood product having as its binding element an adhesive mixture comprising substantially 100 pounds an adhesive mixture comprising substantially 100 pounds of soybean flour; an anti-foam agent, 1.5 pounds; lime, 10–15 pounds; sodium hydroxide (76%), 6–10 pounds; sodium silicate, 20–30 pounds; solvent, 1–2 pounds; unsaturated dibasic acid having 4 carbon atoms, 1/8–1 pound; sodium benzoate, 1/8–1 pound; and water, approximately 400 pounds; said plywood product being characterized by its resistance to mold and fungus growth, and by its water resistant properties being substantially equal to those of a hot press resin plywood, and said adhesive being characterized by its high degree of penetrability.

4. A plywood product having as its binding element an adhesive mixture comprising substantially 100 pounds of soybean flour; an anti-foam agent, 1.5 pounds; lime, 10–15 pounds; sodium hydroxide (75%), 6–10 pounds; sodium silicate, 20–30 pounds; solvent, 1–2 pounds; unsaturated dibasic acid having 4 carbon atoms, 1/8–1 pound; and water, approximately 400 pounds; said plywood being characterized by its water resistant properties being substantially equal to those of a hot press resin plywood, and said adhesive being characterized by its high degree of penetrability.

References Cited in the file of this patent

UNITED STATES PATENTS

| | | |
|---|---|---|
| 1,280,861 | Satow | Oct. 8, 1918 |
| 1,851,951 | Dike | Mar. 29, 1932 |
| 1,985,631 | Davidson et al. | Dec. 25, 1934 |
| 2,097,239 | Bradshaw | Oct. 26, 1937 |
| 2,150,175 | Laucks et al. | Mar. 14, 1939 |
| 2,417,576 | Thomson et al. | Mar. 18, 1947 |
| 2,497,927 | Bruson | Feb. 21, 1950 |
| 2,502,340 | Pickens | Mar. 28, 1950 |
| 2,542,288 | Pickens | Feb. 20, 1951 |
| 2,557,071 | Boehm | June 19, 1951 |
| 2,580,391 | Babcock et al. | Jan. 1, 1952 |
| 2,595,257 | Heritage | May 6, 1952 |
| 2,612,455 | Golick | Sept. 30, 1952 |
| 2,657,163 | Ericks | Oct. 27, 1953 |
| 2,697,090 | Farber | Dec. 14, 1954 |
| 2,810,657 | Preusser | Oct. 22, 1957 |